(12) United States Patent
Arias Haber et al.

(10) Patent No.: US 11,744,687 B2
(45) Date of Patent: Sep. 5, 2023

(54) ORAL IRRIGATOR

(71) Applicant: Braun GmbH, Kronberg (DE)

(72) Inventors: Sabrina Arias Haber, Frankfurt (DE); Markus Sabisch, Waldems (DE); Shyam Kishan Mandre, Bad Soden (DE); Fritz Schubert, Bad Camberg (DE); Ulrike Galloway, Kronberg (DE); Stephanie Venzke, Wiesbaden (DE)

(73) Assignee: Braun GmbH, Kronberg (DE)

( * ) Notice: Subject to any disclaimer, the term of this patent is extended or adjusted under 35 U.S.C. 154(b) by 1117 days.

(21) Appl. No.: 16/415,529

(22) Filed: May 17, 2019

(65) Prior Publication Data

US 2019/0358006 A1     Nov. 28, 2019

(30) Foreign Application Priority Data

May 24, 2018   (EP) .................................... 18174016

(51) Int. Cl.
*A61C 17/024*   (2006.01)
*A61C 17/02*    (2006.01)
(Continued)

(52) U.S. Cl.
CPC .......... *A61C 17/024* (2019.05); *A61C 1/0038* (2013.01); *A61C 1/0092* (2013.01);
(Continued)

(58) Field of Classification Search
CPC . A61C 17/02; A61C 17/0202; A61C 17/0217; A61C 17/024; A61C 17/028;
(Continued)

(56) References Cited

U.S. PATENT DOCUMENTS

| 5,344,317 | A | 9/1994 | Paecher |
| 9,050,160 | B1 * | 6/2015 | Alali .................... A61C 15/046 |

(Continued)

FOREIGN PATENT DOCUMENTS

| CN | 2179746 Y | 10/1994 |
| CN | 203915114 U | 11/2014 |

(Continued)

OTHER PUBLICATIONS

PCT Search Report and Written Opinion for PCT/IB2019/053955 dated Aug. 5, 2019, 14 pages.
Extended European Search Report, dated Nov. 9, 2018; 8 pages.

*Primary Examiner* — Samchuan C Yao
*Assistant Examiner* — Yurie Hong
(74) *Attorney, Agent, or Firm* — Vladimir Vitenberg

(57) ABSTRACT

An oral irrigator has a first liquid container, a nozzle outlet, a pump driven by a drive to pump liquid from the liquid container to the nozzle outlet so that a liquid jet is emitted via the nozzle outlet, a first switch arranged so that the drive is powered when the first switch is actuated once and the oral irrigator is switched into an ON state, and so that powering of the drive is stopped and the oral irrigator is switched into an OFF state when the first switch is actuated once again, and a second switch arranged so that the drive is powered only while the second switch is continuously actuated by the user and powering is stopped when the second switch is released.

13 Claims, 3 Drawing Sheets

(51) Int. Cl.
*A61C 1/00* (2006.01)
*A61H 13/00* (2006.01)

(52) U.S. Cl.
CPC ....... *A61C 17/0202* (2013.01); *A61H 13/005* (2013.01); *A61C 1/0007* (2013.01); *A61H 2201/5035* (2013.01)

(58) Field of Classification Search
CPC ... A61H 13/00; A61H 13/005; A61H 2201/50
See application file for complete search history.

(56) References Cited

U.S. PATENT DOCUMENTS

| | | | |
|---|---|---|---|
| 10,022,207 | B2 | 7/2018 | Taylor |
| 2008/0008979 | A1 | 1/2008 | Thomas |
| 2008/0313829 | A1* | 12/2008 | Dabrowski ........ A46B 15/0044 15/22.1 |
| 2012/0277677 | A1 | 11/2012 | Taylor |
| 2015/0147717 | A1* | 5/2015 | Taylor ................ A61C 17/0202 |
| 2016/0151133 | A1* | 6/2016 | Luettgen ................ F04B 17/03 433/80 |
| 2016/0331117 | A1* | 11/2016 | Follows ................ A61C 17/221 |
| 2017/0056142 | A1 | 3/2017 | Baragona |
| 2017/0238693 | A1 | 8/2017 | Sissons et al. |
| 2017/0318951 | A1 | 11/2017 | Taghvai |
| 2018/0296308 | A1 | 10/2018 | Taylor |

FOREIGN PATENT DOCUMENTS

| | | | | |
|---|---|---|---|---|
| CN | 104379085 | A | 2/2015 | |
| CN | 107949343 | A * | 4/2018 | ............. A61C 17/02 |
| CN | 108056832 | A | 5/2018 | |
| EP | 0500541 | B1 * | 7/1993 | ............. A61C 17/02 |
| EP | 2502598 | A1 | 9/2012 | |
| JP | S5354593 | U | 5/1978 | |
| JP | H04129547 | A | 4/1992 | |
| JP | H0515921 | U | 3/1993 | |
| JP | H08308641 | A | 11/1996 | |
| WO | WO-2015173691 | A1 * | 11/2015 | ........... A61C 1/0015 |
| WO | 2016035031 | A1 | 3/2016 | |
| WO | WO-2016067170 | A1 * | 5/2016 | ........... A61C 1/0015 |

\* cited by examiner

ORAL IRRIGATOR

FIELD OF THE INVENTION

The present disclosure is concerned with oral irrigators, and in particular with oral irrigators having a first switch and a second switch.

BACKGROUND OF THE INVENTION

It is generally known that an oral irrigator might have two switch elements, namely a first switch that switches ON the oral irrigator so that the oral irrigator emits a continuous or pulsed water jet that can be directed to the interdental areas of a user's dentition to clean these areas from debris by the water jet. A second switch can be used to modify a parameter, such as, e.g., the intensity, of the water jet. There is a general demand for improvements of oral irrigators, in particular improvements relating to the usage of the oral irrigator.

SUMMARY OF THE INVENTION

In according with an aspect an oral irrigator is provided having a first liquid container, an nozzle outlet, a pump driven by a drive to pump liquid from the liquid container to the nozzle outlet so that a liquid jet is emitted via the nozzle outlet, a first switch arranged so that the drive is powered when the first switch is actuated once and the oral irrigator is switched into an ON state and so that powering of the drive is stopped and the oral irrigator is switched into an OFF state when the first switch is actuated once again, and a second switch arranged so that the drive is powered only while the second switch is continuously actuated by the user and powering is stopped when the second switch is released.

DETAILED DESCRIPTION OF THE INVENTION

Figure 1A:
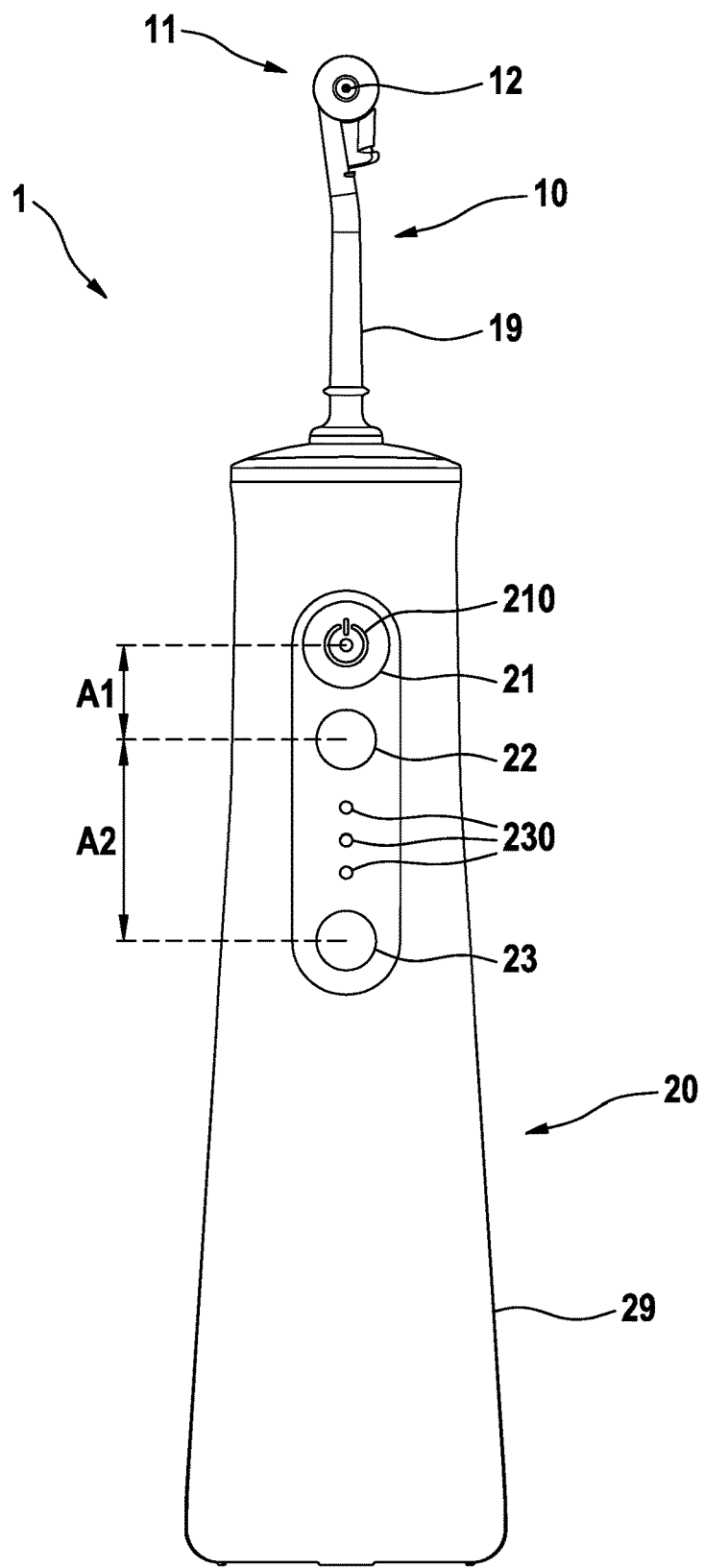
FIG. 1A is a front view of an example oral irrigator in accordance with the present disclosure.

An oral irrigator in accordance with the present disclosure has two switching elements that control the emission of a liquid jet. A first switching element is provided that is arranged to control the emission of the liquid jet by consecutive actuation of the first switching element. If the oral irrigator is assumed to be in an OFF state, then actuating the first switching element once leads to a powering of a drive of the oral irrigator, which drive actuates a pump that pumps liquid from a liquid reservoir through liquid channels to a nozzle outlet, where the liquid jet is emitted (in short, a driven pump is actuated). The oral irrigator is then in an ON state and continuously emits the liquid jet (where the jet may be a continuous or a pulsed jet). The first switching element is only actuated once and the user can then move the actuating finger into another, potentially more comfortable position. In order to stop the powering of the drive (or driven pump), the user has to actuate the first switching element once again. The oral irrigator is then set into the OFF state again.

To allow the user a different and potentially faster control of the water jet, the oral irrigator has a second switch element that only powers the drive to emit the liquid jet while the user continuously actuates the second switch element (i.e. while the user pushes or triggers the second switch element). Thus, the user must always push or trigger the second switch element to emit the liquid jet. When the user wants to switch from one interdental area to the next, the user may release the second switch element for a short time. Once the second switch element is released, the oral irrigator is set into an OFF state and back into the ON state when the user continues to actuate the second switch element when, e.g., the nozzle outlet was moved into its new position. The second switch element thus allows a different way of operating the oral irrigator and the user can choose which way of operating is better suited for the user's preferences of the current irrigation activity.

The first and/or second switch element may be realized as an electro-mechanical switch element such a push-button or as a touch switch element such as a capacitive switch. All usual realizations of switch elements known by a skilled person shall be encompassed.

In some embodiments, a visual indicator is incorporated only into the first switch element, which visual indicator is arranged to indicate that the oral irrigator is in an ON mode. This may be done by a first color, e.g. a green color. The visual indicator may switch to another color, e.g. a red color, when the liquid level in the liquid reservoir has dropped below a threshold level. Instead of changing the color, the visual indicator may start to flash once the liquid drops to the threshold level. As the first switching element needs only to be shortly pushed to switch the oral irrigator into the ON mode, the first switch element is a good choice for incorporation of the visual indicator. Of course, additionally or alternatively, a visual indicator may be a arranged on the outside of the handle of the oral irrigator.

In some embodiments, the user can override the emission of the liquid stream in the ON state by actuating the second switch element so that the water jet is then stopped (i.e. the powering of the drive or driven pump is stopped) when the second switch element is released.

In some embodiments, the ON state is automatically ended after a preselected time period, which preselected time period may lie in the range of between 1 sec and 600 sec, in particular in a range of between 10 sec and 240 sec, further particular in a range of between 20 sec and 120 sec. Additionally or alternately, the ON state may be automatically ended when the liquid level in the liquid container has dropped to a first threshold level.

In some embodiments relating to the previous paragraph, at least one of the first or second switch elements (or another switch element) is arranged to prolong the preselected time period after which the oral irrigator automatically switches from the ON state into the OFF state when the respective switch element is actuated within a preselected control time period after the first switch element was actuated so that the oral irrigator is in the ON state. The prolongation may be a doubling of the preselected time period. A further prolongation may be possible if the respective switch element is actuated a third or even further times within the preselected control time period. Each single actuation may then lead to a prolongation by adding again the preselected time period. E.g. the preselected time period may be 10 seconds, then a first prolongation will mean a 20 seconds period and a second prolongation will mean a 30 seconds period. Of course, the prolongation period may be predetermined but different to the preselected time period. E.g., the preselected time period may be 15 seconds, but each prolongation may add further 5 seconds or a first prolongation may add 10 seconds and a third prolongation may add 5 seconds.

In some embodiments, the oral irrigator comprises an air pump that is arranged to pump air into the liquid stream pumped by the liquid pump through the liquid channel towards the nozzle outlet. In such embodiments, the actuation of the first switch element that brings the oral irrigator into the ON state may also start powering the air pump. In embodiments, where the actuation of the second switch element overrides the first switch element and where an air pump is present, the actuation of the second switch element may lead to stopping the power to the air pump. This allows a user to also control a parameter of the liquid jet that is emitted. The liquid jet without air will be experienced by the user as having a somewhat higher intensity or harshness on the gums.

In some embodiments, the oral irrigator has at least one mode switch element allowing a user to change a mode of the liquid jet emission. E.g. the mode switch element may allow the user to switch between provision of a continuous liquid jet and emission of a pulsed liquid jet. Alternatively or additionally, the mode switch element may allow the user to switch between at least two different intensities of the liquid jet emission. The same mode switch element or another mode switch element may allow for changing a different parameter of the jet emission than the intensity, e.g. the length of liquid jet pulses or the percentage of air mixed into the liquid jet etc. The oral irrigator may comprise at least one indicator, in particular visual indicator, for indicating the chosen mode. In some embodiments, the mode switch element may be arranged so that the mode can be changed while the oral irrigator is in its OFF state. This allows the user to switch mode prior to starting the oral irrigator. As already indicated, at least two or more mode switch elements may be present allowing the control of various liquid jet properties in parallel (e.g. one mode switch element may switch on and off an air pump and a second switch element may switch between at least two liquid jet intensity levels).

In embodiments with a mode switch element and at least one visual indicator to indicate the chosen mode, the mode switch element may be arranged so that the currently selected mode is indicated by the visual indicator when the mode switch element is actuated the first time in the OFF state of the oral irrigator and the next actuation would then change the mode.

In some embodiments, the first and the second switch elements are arranged on the outer side of the oral irrigator with a center-to-center distance of less than about 4 cm, which allows the user to comfortably switch from one type of operation to another. In some embodiments with an additional mode switch element, the mode switch element is arranged on the outside of the oral irrigator with a center to center distance to the closest one of the first and second switch elements of at least 6 cm, so that a user cannot easily mix up the different switch elements while using the oral irrigator.

While the switch elements may be arranged to directly establish an electric contact when actuated and thus start to power the drive or the air pump, the switch elements may be coupled to a control unit that is arranged to power the drive and/or air pump in accordance with the present description.

Figure 1B:
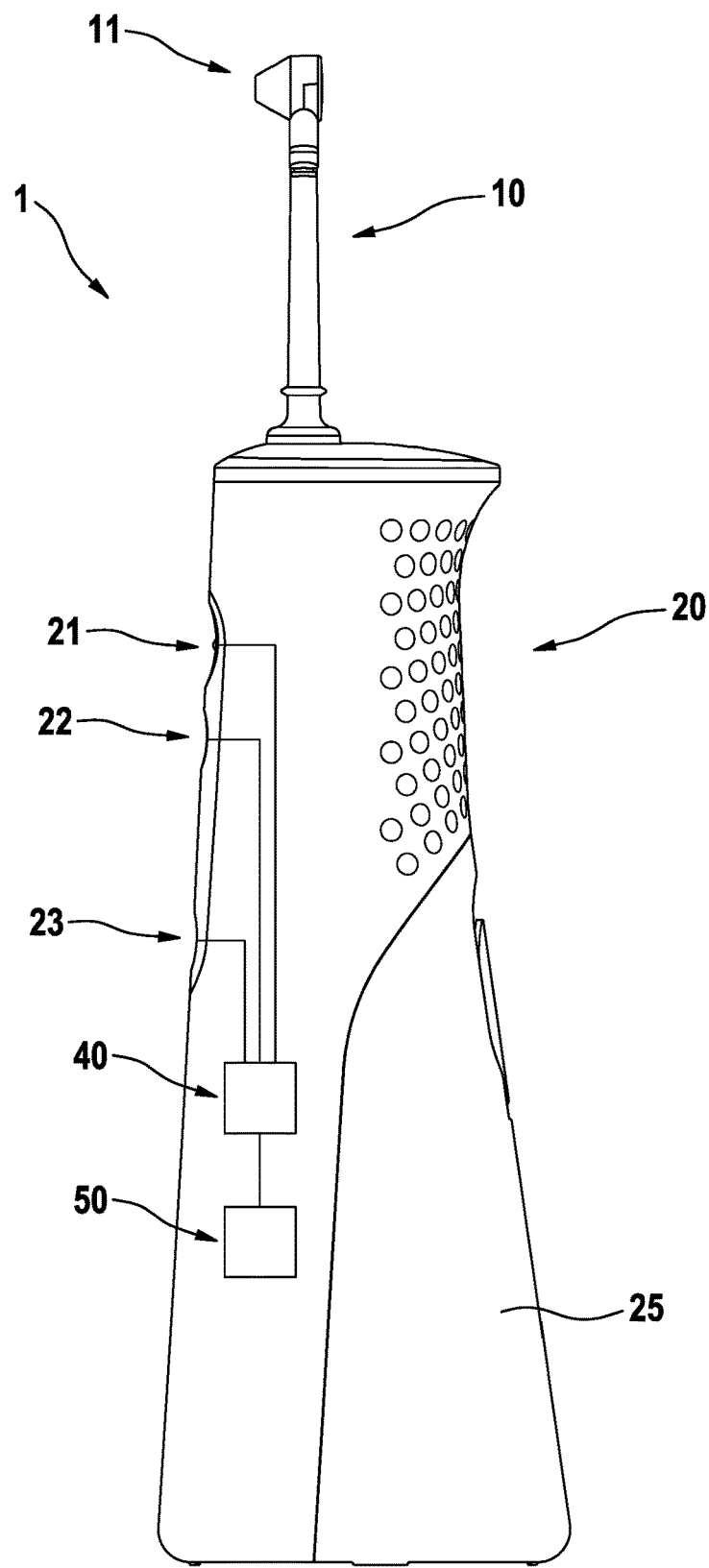
FIG. 1B is a side view of the oral irrigator shown in FIG. 1A.

FIGS. 1A and 1B show two views of an example oral irrigator 1 in accordance with the present disclosure. The oral irrigator 1 has a replaceable nozzle attachment 10 and a handle 20. The replaceable nozzle attachment comprises a housing 19 and a nozzle 11 having a nozzle outlet 12. The handle 20 has a housing 29 and further a first switch element 21, a second switch element 22, and a mode switch element 23, which latter mode switch element 23 is considered optional. An optional visual indicator 210 is incorporated into the first switch element 21 and is arranged to be active (i.e. illuminated) when the oral irrigator 1 is in an ON state. One or several visual indicators 230 may be arranged at the oral irrigator 1 to indicate the selected mode. In FIG. 1B the oral irrigator comprises a liquid reservoir 25. This is considered as one example realization to include a liquid reservoir into the handle of the oral irrigator, but the liquid reservoir may also be a separate container or may be incorporated into a base station. The separate liquid reservoir may then be connected with a handle of the oral irrigator by means of a hose through which the liquid can be pumped.

The first switch element 21 and the second switch element 22 may be arranged on the outer side of the oral irrigator with a center-to-center distance A1 of less than about 4 cm, in particular less than about 3 cm. The mode switch element 23 may be arranged on the outside of the oral irrigator with a center-to-center distance A2 to the closest first or second switch element of more than about 4 cm, in particular of more than about 5 cm, further in particular of more than about 6 cm. The selection of a mode may be allowed while the oral irrigator is in the ON state. E.g. the mode switch element may be arranged to switch from liquid jet emission as a continuous stream into a pulsed mode. Additionally or alternatively, the mode switch button 23 may be arranged to switch between liquid jet with air mixed into the liquid stream to liquid jet emission without air mixed into the stream. Further mode switch elements may be provided to allow independent control of different liquid jet parameters such as pulsed vs. continuous, air mixture vs. no air mixture, intensity, pulse length etc. But the mode switch element may also be arranged to allow the selection of the mode while the oral irrigator is in the OFF state (and in some embodiments, the mode selection may be only enabled while the oral irrigator 1 is in the OFF state but not when the oral irrigator 1 is in the ON state—the mode switch element may be arranged to have a different function in the ON state, e.g. it may be arranged to prolong a predetermined time period during which the oral irrigator emits a water jet while being in the ON state). The mode switch element 23 may be arranged so that the previously selected mode is indicated once the mode switch element 23 is pushed or triggered the first time. A pre-selected mode-selection time period may be decisive for whether the mode switch element 23 is pushed the first time or a second time—e.g. the pre-selected mode-selection time period may be in a range of between 0 seconds and 20 seconds, in particular in a range of between 0.5 seconds and 10 seconds, further in particular in a range of between 1 second and 8 seconds. If the mode switch element 23 is then pushed a second time, the next available mode is selected. The mode switch element 23 may allow to switch between at least two modes, in particular at least three modes.

It is schematically indicated in FIG. 1B that the switch elements 21, 22, and 23 may be coupled with a control unit 40 which is also coupled with a drive 50 for driving a pump.

Figure 2:
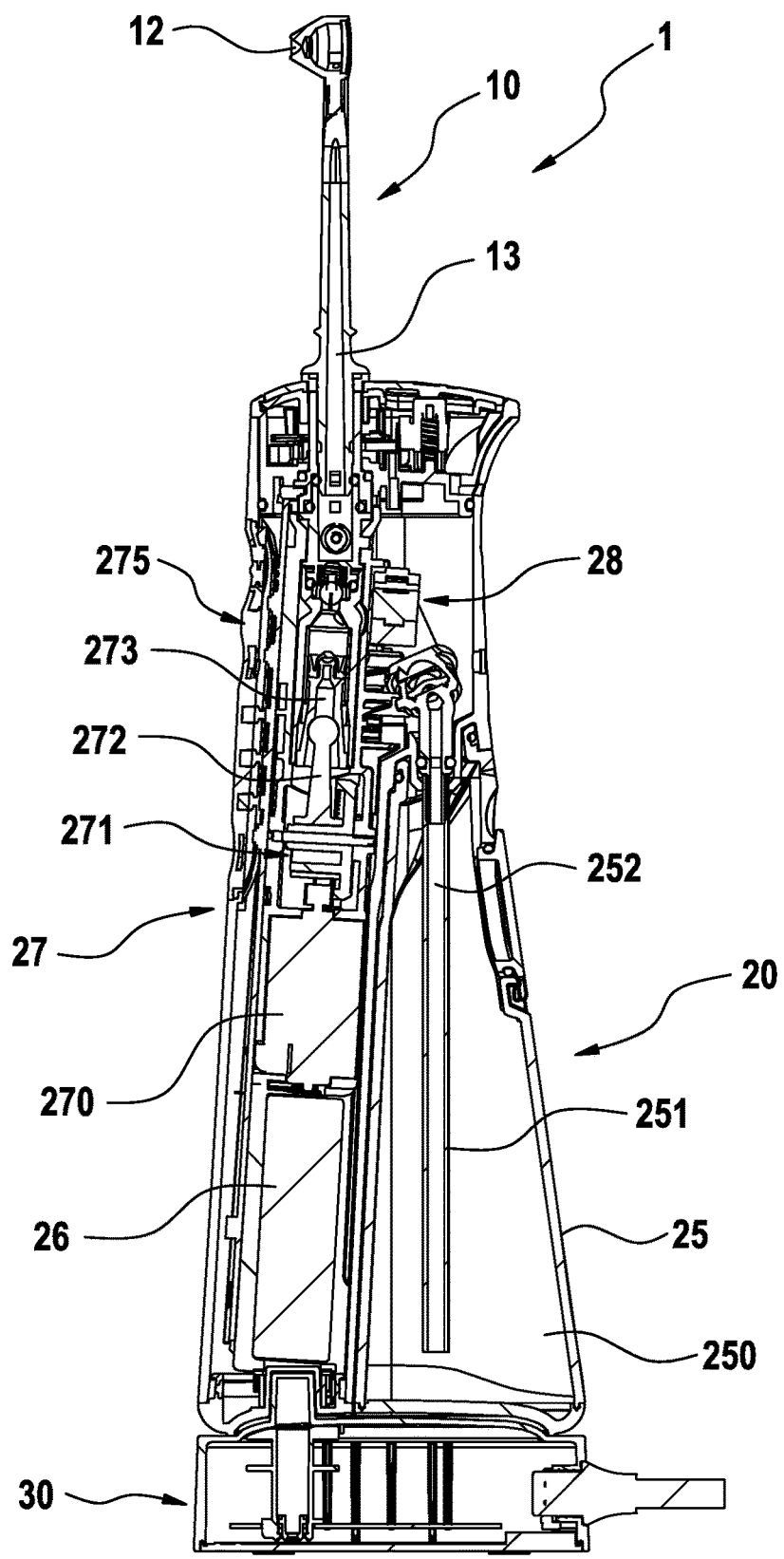
FIG. 2 is a cross-sectional view of the oral irrigator shown in FIGS. 1A and 1B.

FIG. 2 is a cross-sectional image of the oral irrigator 1 shown in FIGS. 1A and 1B, where also a charger 30 is shown arranged for wireless charging of a rechargeable energy storage 26 of the oral irrigator 1. A drive 27 comprises a DC motor 270 (powered by the rechargeable energy storage 26) having a rotating output shaft that is connected via a gear 271 to a connecting rod 272 that drives a piston 273 of a pump 275. Instead of a DC motor 270 the drive 27 may comprise any other known source for driving the pump, e.g. a linear motor. The oral irrigator 1 comprises an air pump 28 for selectively pumping air into the liquid. Instead of a rechargeable energy storage 26, an in particular replaceable battery may be used as energy storage or the oral irrigator is powered via a mains cable or via an external power supply.

The liquid reservoir 25 comprises an inner cavity 250 for storing a liquid such as plain water or a mouth rinse and a hose 251 arranged in the inner cavity 251 so that in operation the pump 275 pumps liquid from the liquid reservoir 25 through a channel 252 in the hose 251 via the pump chamber into a channel 13 of the nozzle attachment 10 so that a liquid jet is emitted via the nozzle outlet 12. Instead of a single liquid reservoir, two or more liquid reservoirs may be present and the supply of the one or other liquid may be controllable, e.g. by a respective switch element or in a given mode, the two or more different liquids may be mixed together with a given mixing ratio or the two or more liquids may be sequentially provided in accordance with a given sequence description.

A user can operate the oral irrigator in two different ways. In the first way, the oral irrigator 1 is in an OFF state (i.e. the drive is not powered and liquid is not ejected) and the user then actuates the first switch element 21 by a short push or triggering action. The oral irrigator 1 is then switched into an ON state and the drive 27 is powered so that the pump 275 is driven into a pumping action that pumps the liquid from the liquid reservoir 25 to the nozzle outlet 12 so that a liquid jet is emitted. The operation of the oral irrigator 1 in accordance with the first way may include powering of the air pump 28 as well, but alternately a further switch may be arranged for selective ON/OFF switching of the air pump 28. When the user actuates the first switching element 21 again by a further short push or triggering action, then the oral irrigator 1 is switched into the OFF state again and powering of the drive 27 is stopped. In the second way, the oral irrigator 1 is in the OFF state and the user actuates the second switch element 22, but instead of just pushing it shorty to switch the oral irrigator 1 into the ON state, the user has to constantly push or trigger the second switch element 22 in order to maintain the powering of the drive 27 and thus to maintain the emission of the liquid jet. Once the second switch element 22 is released, the powering of the drive 27 is stopped and thus the emission of the liquid jet is stopped.

The oral irrigator 1 may be arranged so that the ON state is automatically interrupted and the oral irrigator 1 is switched into the OFF state after a preselected time period.

In case that the oral irrigator 1 is in the ON state after the user had pushed the first switch element 21 and the user then actuates the second switch element 22, the actuation of the second switch element may override the first switch element 21. Instead of ignoring that the user has actuated the second switch element 22 while the oral irrigator emits the liquid jet in an ON state initiated by the first switch element, the actuation of the second switch element 22 brings the oral irrigator 1 into the second way of operation, i.e. the powering of the drive 27 will then be stopped once the second switch element 22 is released. Alternatively, actuation of the second switch element 22 while the oral irrigator 1 is in an ON state initiated by the first switching element 21 may be ignored and the oral irrigator 1 further emits the water jet until the first switch element is again actuated or until a preselected time period has passed.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An oral irrigator comprising
    a first liquid container;
    a nozzle outlet;
    a pump driven by a drive to pump liquid from the liquid container to the nozzle outlet so that a liquid jet is emitted via the nozzle outlet;
    a first switch configured to power the drive only when the first switch is actuated once and the oral irrigator is switched into an ON state and so that powering of the drive is stopped and the oral irrigator is switched into an OFF state when the first switch is actuated once again; and
    a second switch configured to power the drive only while the second switch is continuously actuated by the user and powering is stopped when the second switch is released by the user,
    wherein the first switch and the second switch are disposed at a distance from one another and configured to operate independently from one another,
    wherein the second switch is configured to override the first switch when, prior to actuation of the second switch, the oral irrigator is in the ON state, and
    wherein releasing the second switch after overriding the first switch stops powering of the drive.

2. The oral irrigator in accordance with claim 1, further comprising an air pump is configured to pump air into the liquid before the liquid exits the oral irrigator via the nozzle outlet as a liquid jet, wherein the first switch is configured so that the air pump is powered when the oral irrigator is switched into the ON state.

3. The oral irrigator in accordance with claim 2, wherein the second switch is configured so that the air pump is stopped when the second switch is actuated to override the first switch.

4. The oral irrigator in accordance with claim 1, wherein the oral irrigator is configured to automatically switch from the ON state into the OFF state after a preselected time period.

5. The oral irrigator in accordance with claim 4, wherein one of the first switch and the second switch is configured to prolong the preselected time period by a preselected prolongation time period if the switch is actuated within a preselected control time period after the first switch is actuated to switch the oral irrigator into the ON state.

6. The oral irrigator in accordance with claim 1, wherein the first switch and the second switch are configured to be on the outer side of the oral irrigator with a center-to-center distance therebetween of less than about 4 cm.

7. The oral irrigator in accordance with claim 1, wherein a visual indicator is incorporated only into the first switch to indicate that the oral indicator is in the ON state.

8. The oral irrigator in accordance with claim 1, wherein the oral irrigator comprises a mode switch configured to switch between different modes of operation of the liquid jet emission.

9. The oral irrigator in accordance with claim 8, wherein the mode of operation can be selected with the mode switch while the oral irrigator is in the OFF state.

10. The oral irrigator in accordance with claim 8, further comprising an indicator for indicating what mode of operation has been selected.

11. The oral irrigator in accordance with claim 8, wherein the mode switch is configured so that the previously selected mode is indicated when the mode switch is actuated once and so that the mode is switched when the mode switch is actuated once again.

12. The oral irrigator in accordance with claim 8, wherein the mode switch is located on the outside of the oral irrigator with a distance of at least about 6 cm from the closest of the first switch and the second switch.

13. The oral irrigator in accordance with claim 1, further comprising a control unit connected to at least the first switch, the second switch, and the drive.

\* \* \* \* \*